US006956820B2

(12) United States Patent
Zhu et al.

(10) Patent No.: US 6,956,820 B2
(45) Date of Patent: Oct. 18, 2005

(54) METHODS, SYSTEMS, AND COMPUTER PROGRAM PRODUCTS FOR VOICE OVER IP (VOIP) TRAFFIC ENGINEERING AND PATH RESILIENCE USING NETWORK-AWARE MEDIA GATEWAY

(75) Inventors: Rupert Zhu, Richardson, TX (US); David Z. Lu, Dallas, TX (US); San-Qi Li, Plano, TX (US); Edward Y. Qian, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 0 days.

(21) Appl. No.: 10/943,275

(22) Filed: Sep. 17, 2004

(65) Prior Publication Data

US 2005/0083844 A1 Apr. 21, 2005

Related U.S. Application Data

(63) Continuation-in-part of application No. 10/676,233, filed on Oct. 1, 2003.
(60) Provisional application No. 60/526,126, filed on Dec. 1, 2003, and provisional application No. 60/551,814, filed on Mar. 10, 2004.

(51) Int. Cl.[7] .......................... H04L 12/56; H04L 12/66; H04L 1/22
(52) U.S. Cl. .................... 370/230.1; 370/238; 370/255; 370/401; 370/463
(58) Field of Search ............................... 370/216–218, 370/225–231, 235, 237, 238, 252, 254, 255, 351–356, 400, 401, 419, 420, 463, 395.2–395.31

(56) References Cited

U.S. PATENT DOCUMENTS 6,714,535 B1 * 3/2004 Herh .......................... 370/352

| | | | |
|---|---|---|---|
| 6,771,673 B1 | 8/2004 | Baum et al. | |
| 2002/0016926 A1 | 2/2002 | Nguyen et al. | |
| 2003/0118039 A1 * | 6/2003 | Nishi et al. | 370/401 |
| 2003/0142795 A1 * | 7/2003 | Gavette et al. | 379/67.1 |

OTHER PUBLICATIONS

"A Media Stream Processing of VoIP Media Gateway", Hyun–Kyung Yoo; Byung–Ryong Kang; Communications, 2003. APCC 2003. The 9th Asia–Pacific Conference on, vol.: 1, Sep. 21–24, 2003 pp.: 91–94 vol. 1.*

International Search Report and Written Opinion for International Application No. PCT/US04/31918 (Feb. 11, 2005).

* cited by examiner

Primary Examiner—Hassan Kizou
Assistant Examiner—Gregory Sefcheck
(74) Attorney, Agent, or Firm—Jenkins, Wilson & Taylor, P.A.

(57) ABSTRACT

Methods and systems for providing voice over IP traffic engineering and path resilience using a network-aware media gateway are provided. In a media gateway, voice over IP hosts are assigned a first set of IP addresses. Network interfaces in the media gateway are assigned a second set of IP addresses that differ from the first set of IP addresses. Per-interface routers advertise reachability information from at least one of the voice over IP hosts via multiple interfaces and participate in network routing protocols to generate per interface routing tables. Voice over IP path lists may be generated based on the per interface routing tables. Internal costs may be assigned to the associations between the voice over IP hosts and the interfaces based on traffic engineering criteria.

54 Claims, 13 Drawing Sheets

METHODS, SYSTEMS, AND COMPUTER PROGRAM PRODUCTS FOR VOICE OVER IP (VOIP) TRAFFIC ENGINEERING AND PATH RESILIENCE USING NETWORK-AWARE MEDIA GATEWAY

RELATED APPLICATIONS

This application is a continuation-in-part of U.S. patent application Ser. No. 10/676,233, filed Oct. 1, 2003 and further claims the benefit of U.S. Provisional Patent Application Ser. No. 60/526,126, filed Dec. 1, 2003, and U.S. Provisional Patent Ser. No. 60/551,814, filed Mar. 10, 2004; the disclosures of which are incorporated herein by reference in their entirety.

The disclosure of the following the U.S. patent application entitled "Methods, Systems, and Computer Program Products for Voice Over IP (VoIP) Traffic Engineering and Path Resilience Using Media Gateway and Associated Next-Hop Routers", commonly owned and simultaneously filed herewith, is incorporated by reference herein in its entirety.

TECHNICAL FIELD

The present invention relates to methods, systems, and computer program products for providing voice over IP traffic engineering and path resilience. More particularly, the present invention relates to methods and systems for providing VoIP traffic engineering and path resilience using a network-aware media gateway.

RELATED ART

Recently in modern telephony, voice service providers and carriers have been transitioning from the traditional Time Division Multiplexing (TDM) network infrastructures to IP-based networks. Utilizing IP-based networks, voice traffic can be converted into packets and carried over IP networks. Although an IP network can be utilized to carry voice traffic, voice and data have very different characteristics. Thus, traditional TDM networks, which were designed for voice traffic, differ significantly from IP networks in terms of their capabilities, working mechanisms, and operation.

In a TDM network, voice traffic is directed from node to node based on statically provisioned routing tables. Routing is applied on a per call basis. Once the route for a call is selected, it is typically not changed for the duration of the call. Different calls from the same source to the same destination can be distributed over multiple different paths based on a set of provisioned policy rules, such as traffic loading of the links, time-of-day, and costs. The capability of distributing traffic among multiple paths is referred to as traffic engineering. In TDM networks, traffic is symmetric in both directions, its patterns are predictable, and voice quality is ensured. TDM networks are typically reliable because redundant protection and fail-over mechanisms are integral parts of the structure. Any failure triggers alarms and events for easy tracing to the root cause, and appropriate actions, such as voice call rerouting, can be taken to minimize service disruption.

Some of the important features of TDM networks include traffic engineering and load balancing. TDM networks can allocate calls over a set of eligible trunk groups based on preference, cost, policy, or dynamic performance monitoring. For example, some telephony providers may have a predetermined bandwidth price schedule based on time-of-day and day-of-week. To minimize cost, a telephony switch manager can pre-program its trunk selection algorithm accordingly, so that new calls are allocated over the trunk group incur the lowest cost during that time period. The price of bandwidth may also change more dynamically. In such instances, it is important for telephony switch managers to be able to quickly adjust the trunk group selection algorithm.

Another important feature of TDM networks includes physical layer redundancy mechanisms, such as facility protection and Synchronous Optical Network (SONET) line and ring protection. When a network failure occurs, the affected traffic can be automatically switched over to an alternative physical path in TDM networks. This fail-over is transparent to the telephony layer.

TDM networks also include a full set of failure notification functions. If a non-recoverable network failure occurs, a notification, such as an Alarm Indication Signal (AIS) or Remote Defect Indication (RDI), can be sent along a transmission path to the telephone switch. The switch can alarm a network operator and take suitable actions on affected calls. This feature of TDM networks can provide a TDM network operator with knowledge about call status and quality.

Traffic engineering, fail-over, network surveillance, and reporting are very important features in TDM networks for assuring optimum bandwidth utilization, Quality of Service (QoS), cost reduction, and traffic resilience. IP telephony has not been fully developed to provide many of these features. Therefore, it is desirable to include these features in IP networks and, in particular, Voice over IP (VoIP) deployment.

Some of the lack of features in IP telephony and VoIP deployment can be traced to the implementation of media gateways (MGs) and media gateway controllers (MGCs). Media gateways are typically used for media stream switching and, in particular, voice traffic switching. Media stream switching includes switching media packets between input and output ports and converting the media packets into the appropriate formats for the sending and receiving parties. Call control, which includes setting up and tearing down calls and maintaining call state machines, is performed by a media gateway controller. Media gateway controllers communicate call control information to media gateways via a media gateway control protocol. Typical media gateway control protocols, such as MGCP and MEGACO, include commands for communicating information about each endpoint of a session to the media gateway and instructing the media gateway as to how to process packets to be delivered to each endpoint.

FIG. 1 is a schematic diagram illustrating a plurality of media gateways 100, 102, 104, and 106 interconnected through an IP network 108. In this example, each media gateway 100, 102, 104, and 106 is connected to IP network 108 through one network interface. Calls can be set up between media gateways 100, 102, 104, and 106. For example, a call between media gateways 100 and 102 can follow path 110. When the capacity of path 110 is exceeded, calls will be rejected. This is because traffic is forwarded on a per packet basis with a destination-based routing scheme, where each node determines outgoing traffic based on the IP destination address. Calls can be rejected due to insufficient bandwidth resources on path 110, even though another path, such as path 112, is available to carry traffic between media gateways 100 and 102. Thus, the IP forwarding scheme used by conventional media gateways can result in a low utilization of network resources. Further, if a network event occurs that makes media gateway 102 unreachable from media gateway 100, media gateway 100 is not informed and may continue to transmit voice traffic to media gateway 102. This is because conventional media gateways only act as IP hosts without knowledge of the current network status. Summarily, media gateway 100 serves as an IP host and has neither traffic engineering support nor network-awareness capability. Although carriers are trying to handle these issues by employing more sophisticated technologies, such as Multi Protocol Label Switching (MPLS), on top of IP networks, these technologies can further complicate the network system in terms of networks operations and maintenance.

FIG. 2 is a schematic diagram illustrating a plurality of media gateways interconnected through an IP network 108. In this example, media gateway 200 includes a plurality of interfaces and communicates with single-interface media gateway 102 via paths 202 and 204. Media gateway 200 may behave as a multi-homing IP host with different IP addresses associated with each of its interfaces IP1 and IP2. If calls between media gateways 200 and 102 are distributed on paths 202 and 204, calls allocated on path 202 carry a local IP address $IP_1$, while calls allocated on path 204 carry local IP address $IP_2$. If path 202 becomes unreachable, media gateway 200 is not capable of re-allocating existing calls from path 202 to path 204 because the local IP addresses are different on the two paths. Thus, network resilience is not achieved.

Accordingly, in light of the difficulties associated with IP telephony and, in particular, with media gateways, there exists a need for improved IP telephony systems, media gateways, and related processes.

DISCLOSURE OF THE INVENTION

According to one aspect, the present invention includes methods and systems for providing VoIP traffic engineering and path resilience using a network-aware media gateway in which voice over IP hosts appear on multiple interfaces of the network-aware media gateway. In one exemplary media gateway, voice over IP hosts have their own internal IP addresses. The voice over IP hosts are each connected to a plurality of the network interfaces associated with the media gateway. Internal routers associated with each interface in the media gateway advertise reachability information to the voice over IP hosts via the multiple interfaces and participate in routing protocols to build network topology and cost information. The multi-appearance capability of such a media gateway allows external routers to choose different paths to the voice over IP hosts, for both traffic engineering and resilience purposes. The participation in routing protocols enables the media gateway to switch outgoing media sessions from one path to another to the other to provide end-to-end network resilience.

Accordingly, it is an object of the invention to provide a network-aware media gateway that provides end-to-end media session path resilience.

It is another object of the invention to provide a multi-appearance, network-aware media gateway that allows voice over IP hosts to be reached via multiple interfaces and that advertises this reachability information to routers in the network.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Exemplary embodiments of the present invention will now be explained with reference to the accompanying drawings, of which.

DETAILED DESCRIPTION OF THE INVENTION

Figure 1:
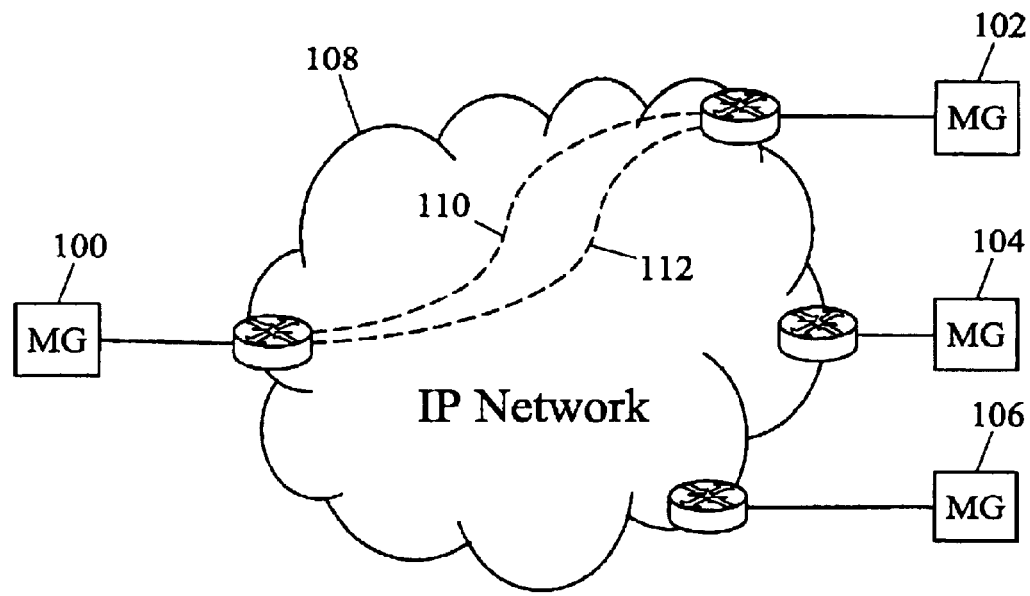
FIG. 1 is a network diagram illustrating a conventional voice over IP network with a single-interface media gateway and no path resilience.
Figure 2:
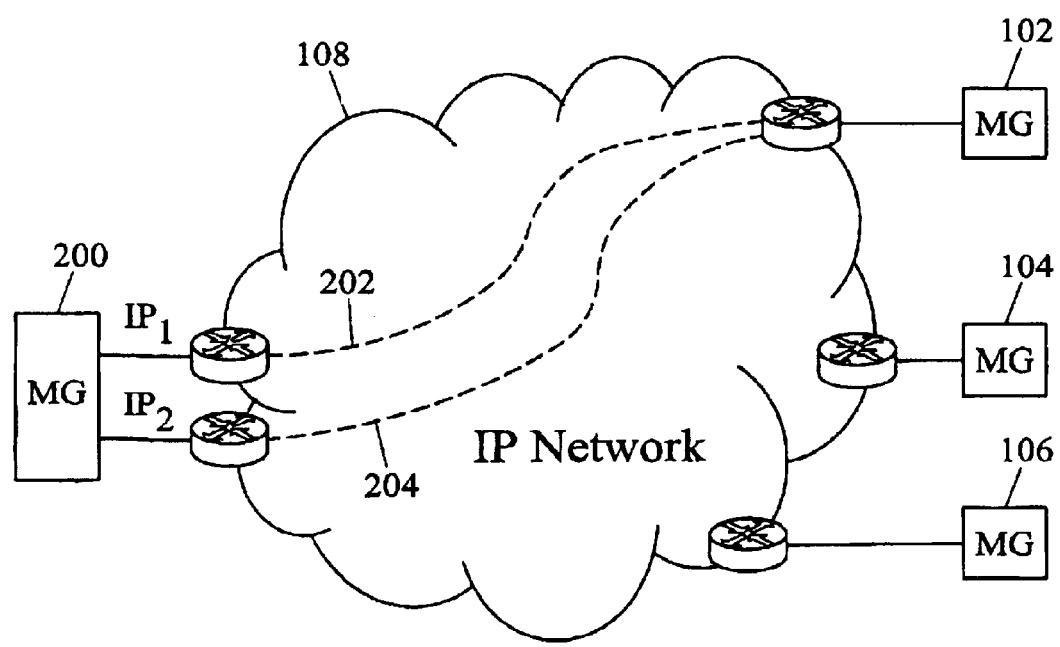
FIG. 2 is a network diagram illustrating a conventional voice over IP network with a dual-interface media gateway and no path resilience.
Figure 3:
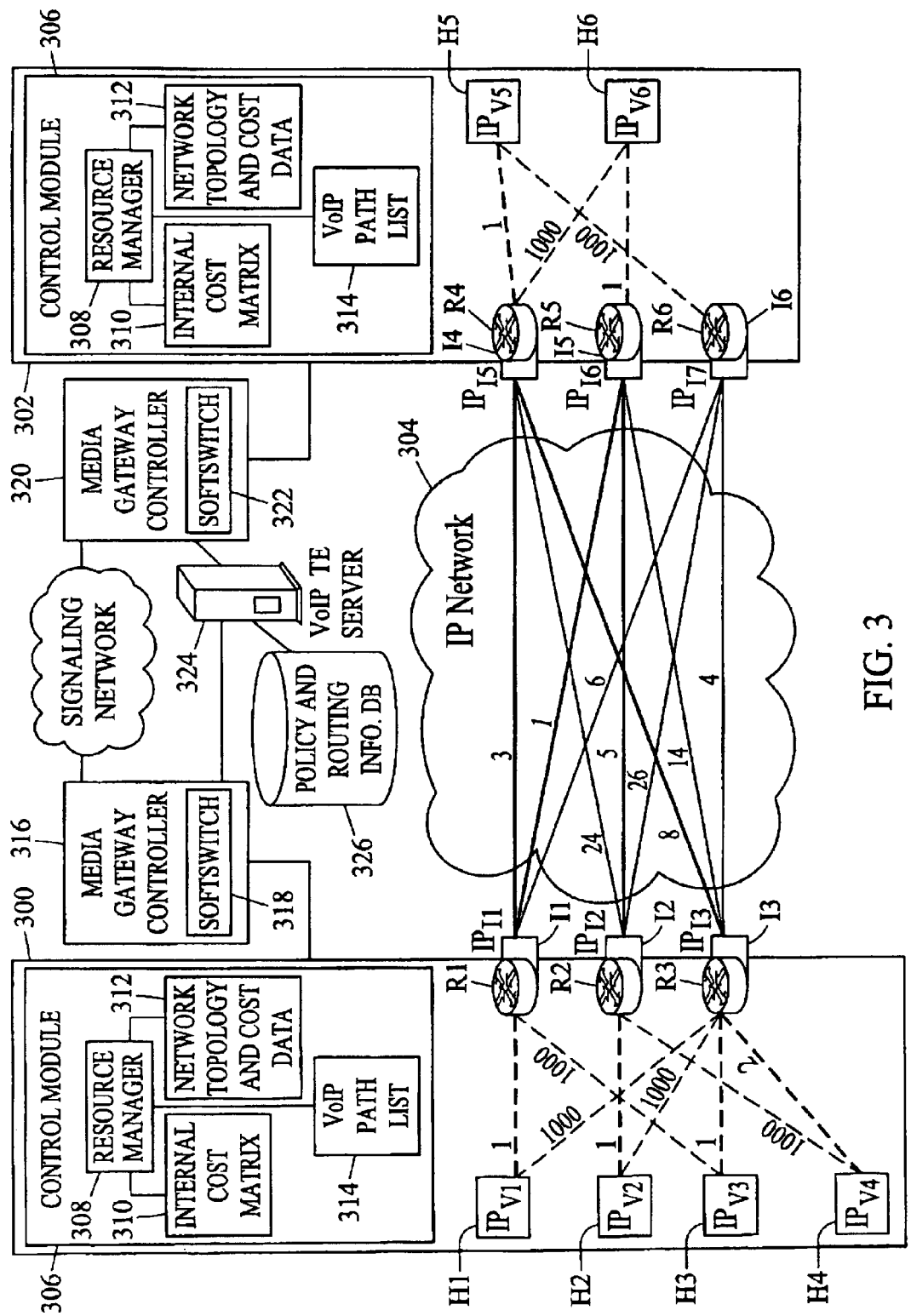
FIG. 3 is a block diagram illustrating a voice over IP network including a network-aware media gateway according to an embodiment of the present invention.

Methods, systems, and computer programs products are disclosed herein for providing VoIP traffic engineering and path resilience using a network-aware media gateway. FIG. 3 is a schematic diagram illustrating exemplary network-aware media gateways 300 and 302 according to an embodiment of the present invention. Referring to FIG. 3, media gateways 300 and 302 are connected via an IP network 304 including multiple voice over IP paths with costs assigned by the network. Media gateways 300 and 302 are both preferably network-aware by participating in network routing protocols. Alternatively, media gateway 302 may be a non-network-aware media gateway.

In the illustrated example, media gateway 300 includes voice over IP hosts H1–H4, a plurality of network interfaces I1–I3, per interface routers R1–R3 associated with each interface, a control module 306, a resource manager 308, an internal cost matrix 310, network topology and cost data 312. and a voice over IP path list 314. Media gateway 302 likewise includes interfaces I5–I7, per interface routers R4–R6, voice over IP hosts H5 and H6, and a control module with components 308, 310, 312, and 314. In FIG. 3, the components of media gateway 302 are assumed to be similar in function to the corresponding components of media gateway 300. Hence, for simplicity of illustration, the components and operation of media gateway 302 will not be provided herein.

Each voice over IP host H1–H4 contains voice processing resources for processing voice over IP and TDM voice streams. For example, each voice over IP host may include codecs, voice over IP, ATM, and TDM chips, and digital signal processing resources for processing voice over IP streams. A detailed description of exemplary resources that may be found in voice over IP hosts H1–H4 are described in commonly assigned, co-pending U.S. patent application Ser. No. 10/676,233, the disclosure of which is incorporated herein by reference in its entirety.

According to an important aspect of the invention, voice over IP hosts H1–H4 are each assigned individual IP addresses $IP_{v1}$–$IP_{v4}$. These individual IP addresses are each reachable through multiple IP interfaces. In order to make nodes in the network aware of the multi-reachability over the voice over IP hosts, per interface routers R1–R3 advertise reachability information and associated costs information to each voice over IP host IP address to routers in IP network 304 Because of the multi-interface visibility of voice over IP hosts H1–H4, routers in IP network 304 can dynamically select different paths to a particular voice over IP host if a single path fails. In addition, as will be described in detail below, the owner or operator of media gateway 300 may implement traffic engineering by assigning costs to internal associations between hosts H1–H4 and routers R1–R3 to engineer voice traffic over different network paths.

In addition to advertising reachability information to voice over IP hosts H1–H4, per interface internal routers R1–R3 preferably also collect link state information from IP network 304 and maintain per interface routing tables, which are used in generating a voice over IP path lists to voice over IP destinations. Voice over IP sessions are assigned to the paths in the path lists, which are dynamically updated based on the per interface routing information. As a result of the dynamic path updating, if one path to the remote end of a voice over IP session fails, because routers R1–R3 are dynamically updated by the routing protocols, the voice over IP session can be dynamically switched over an alternate path.

Control module 306 in media gateway 300 controls the overall operation of media gateway 300 and communicates with media gateway controller 316 to set up and tear down calls. Resource manager 308 of control module 306 allocates new voice over IP sessions to incoming calls, builds network topology and cost data 312 based on routing protocol information received by per interface routers R1–R3, and assigns VoIP sessions to VoIP paths stored in VoIP path list 314.

Resource manager 308 may assign a voice over IP session to one of the hosts H1–H4. Resource manager 308 use hosts H1–H4 dynamically as a shared resource. Resource manager 308 may then populate voice over IP session tables that are maintained by each per interface router R1–R3.

Internal cost matrix 310 contains internal costs associated with associations between voice over IP hosts H1–H4 and per interface internal routers R1–R3. The data stored in internal cost matrix 310 may be statically provisioned by a network operator. Examples of data that may be stored in internal cost matrix 310 will be described in detail below.

Media gateway controller 316 may include an internal softswitch 318 for controlling the operations of media gateway 300. Similarly, media gateway controller 320 may include an internal softswitch 322 for setting up and tearing down sessions in media gateway 300. As discussed above, communications between media gateways and their associated media gateway controllers may occur via a standard media gateway control protocol, such as MGCP or MEGACO. A voice over IP traffic engineering server 324 may perform traffic engineering functions based on policy and routing information stored in policy and routing information database 326. Exemplary traffic engineering functions that may be provided by voice over IP traffic engineering server 324 will be described in detail below.

Figure 4A:
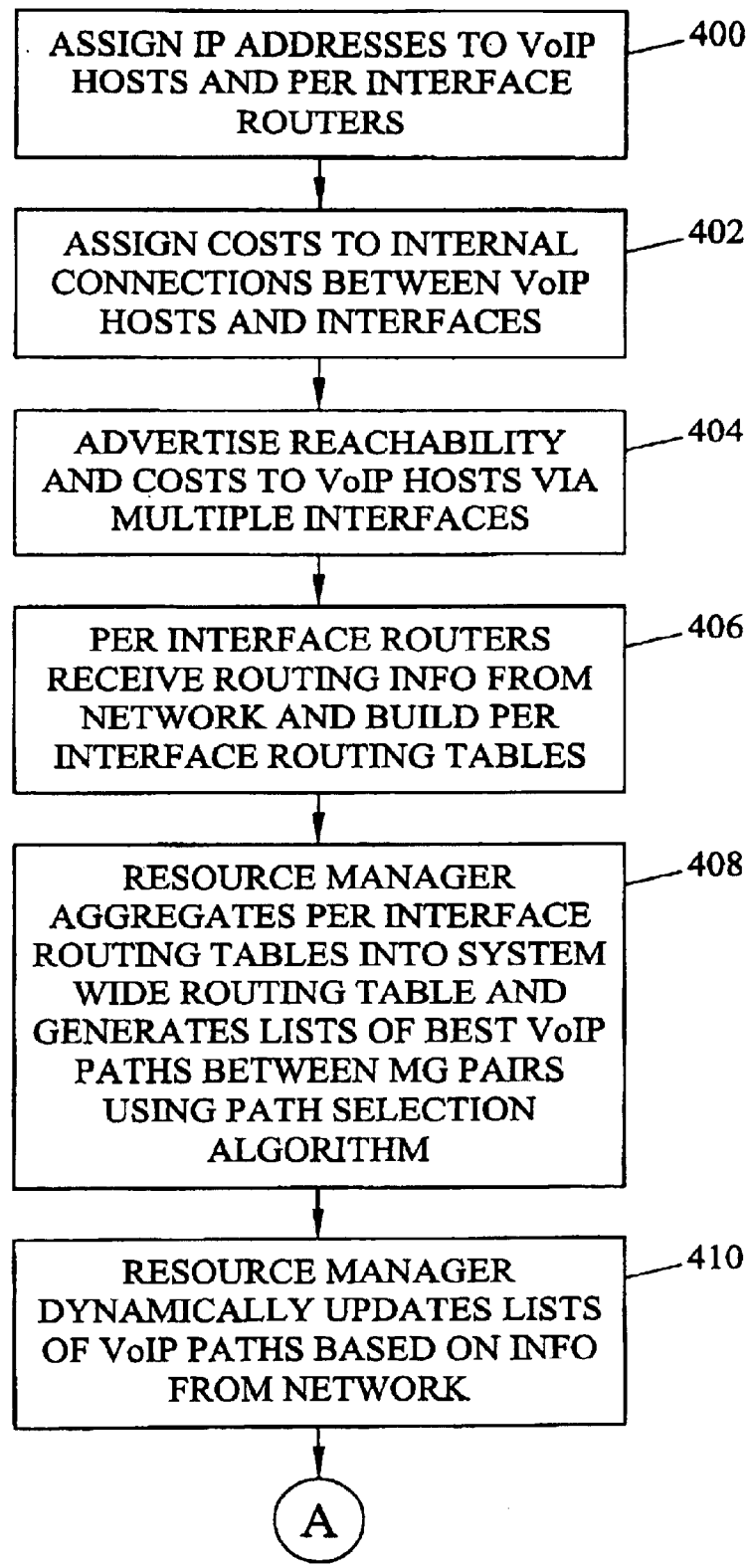
FIGS. 4A and 4B are a flow chart that illustrates exemplary steps that may be performed in providing voice over IP traffic engineering and path resilience using a network-aware media gateway according to an embodiment of the present invention.
Figure 4B:
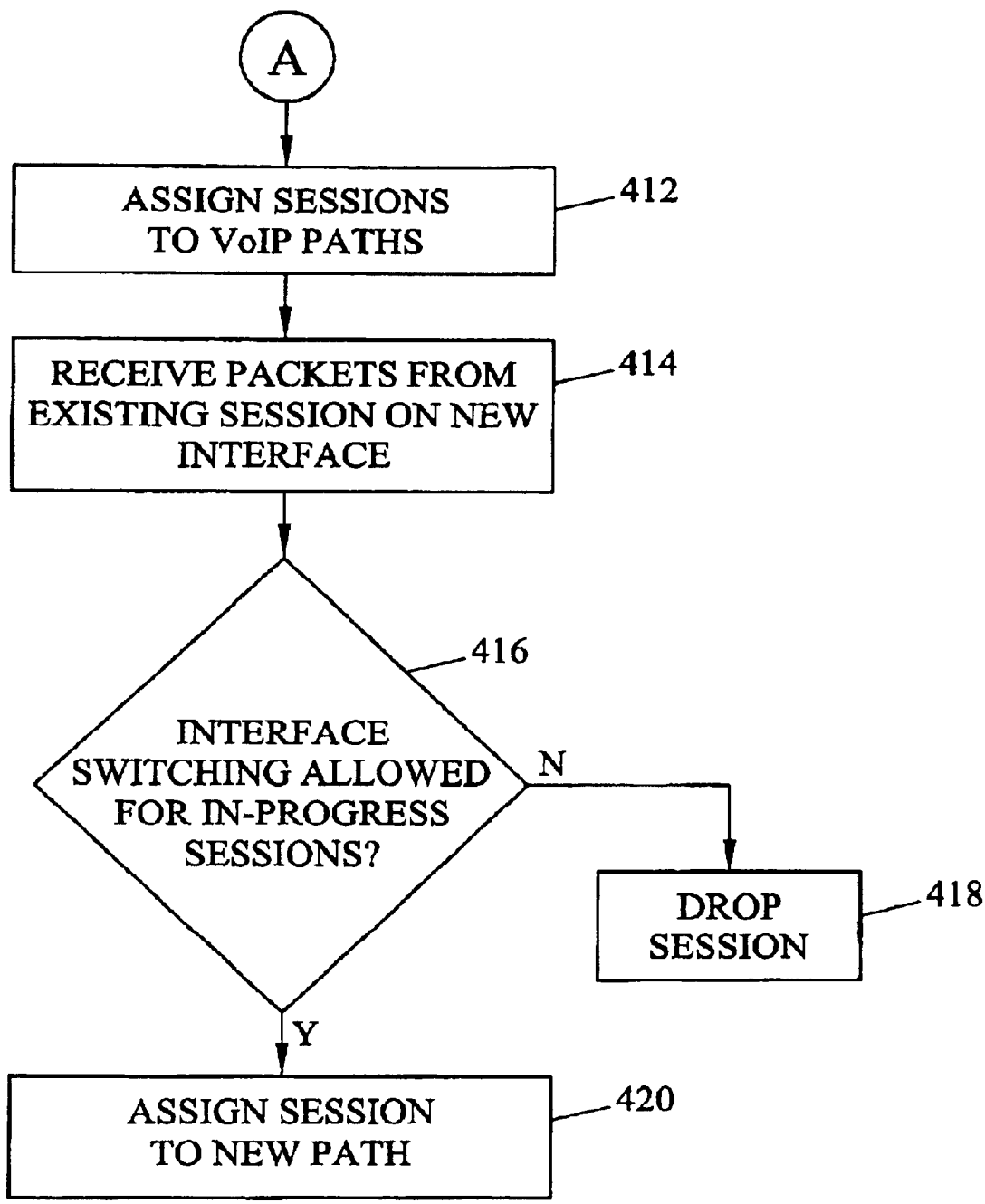

FIGS. 4A and 4B are a flow chart illustrating an exemplary overall steps for in providing VoIP traffic engineering and path resilience using a network-aware media gateway according to an embodiment of the present invention. Referring to FIG. 4A, in step 400 a media gateway operator assigns separate IP addresses to voice over IP hosts and per interface routers in the media gateway. In step 402, the media gateway operator assigns costs to internal connections between the voice over IP hosts and the interfaces associated with each per interface router. The costs may be assigned for traffic engineering purposes, such as load sharing, or for providing path redundancy.

In step 404, media gateway 300 advertises reachability and costs of internal paths voice over IP hosts via the multiple interfaces. Using OSPF as an example, this step may be performed by sending Open Shortest Path First (OSPF) link state messages to network routers. The costs associated with internal network connections may be set by the media gateway operator to be compatible with the costs assigned by routers in the network to external connections so that network routers can include the internal link costs in their route cost computations. In one implementation, internal costs can be set to be equal to network route costs so that changes in internal route costs will have the same effect on end-to-end routes as changes in external route costs. In an alternate implementation, internal link costs may be set much greater than network route costs, i.e., at least one order of magnitude greater than network route costs, so that changes in network routes will not affect internal routes. In yet another alternate implementation, internal route costs may be set much less than, i.e., at least one order of magnitude less than, network route costs so that internal costs will have no effect on influencing routing in the network.

In step 406, the per interface routers receive routing information from the network and build per interface routing tables. Building per interface routing tables in a media gateway enables the media gateway to dynamically respond to changing conditions in the network.

In step 408, resource manager 308 aggregates the per interface routing tables into a system wide routing table and generates a list of the best voice over IP paths between media gateway pairs using a path selection algorithm. This step assumes that the media gateway may or may not be provisioned with knowledge of IP addresses of voice over IP hosts in peer media gateways. The list of voice over IP paths can be computed with each known media gateway destination based on the routing information received in step 406. Exemplary path selection algorithms will be described in detail below.

In step 410, resource manager 308 dynamically updates the list of voice over IP paths based on routing information received from the network. This step may include deleting paths that become unavailable and replacing high cost paths with lower cost paths. Referring to FIG. 4B, in step 412, resource manager 308 assigns sessions to voice over IP paths. This step may include selecting a path from one of the pre-computed path lists.

In step 414, if one path in a network fails or experiences a change in cost relative to other paths, packets may arrive on a different interface of media gateway 300 from the interface associated with the path to which a session was originally assigned. If this occurs, media gateway 300 may be configurable by the operator to allow packets from an existing session on a new interface or not to allow interface switching. One reason to allow interface switching is to provide end-to-end redundancy. One reason that it may not be desirable to allow interface switching is to individually control bandwidth allocated to each interface. Accordingly, in step 416, the media gateway determines whether interface switching is allowed for in-progress sessions. If interface switching is not allowed, control processed to step 418 where the session is dropped. If interface switching is allowed, control proceeds to step 420 where the session is assigned to a new path.

Thus, using the steps illustrated in FIGS. 4A and 4B, network-wide path resilience and traffic engineering can be achieved using a network-aware media and path cost assignment gateway.

Participation in Network Routing Protocols and Path Cost Computation

As stated above, based on costs assigned to each interface and costs associated with all available VoIP paths to media gateway 302, media gateway 300 may compute total costs for delivering VoIP traffic from IP hosts H1–H4 to IP hosts H5–H6. Resource manager 308 can determine the costs of the paths to MG 302 utilizing costs received via a routing protocol, such as the OSPF routing protocol. Per interface routers R1–R3 can participate in routing information exchange with IP network 300 and appear as a router to IP network 300. Per interface routers R1–R3 may receive and process routing updates and determine reachability and routing costs to remote IP addresses independently. As indicated in FIG. 4, resource manager 308 preferably combines per interface routing tables with internal cost matrix to calculate a system-wide routing table that represents shortest paths from each voice over IP host to each destination.

In order to be network-aware, each per interface routers R1–R3 may include an OSPF protocol stack for OSPF link state announcement message exchange and OSPF computation. The protocol stack may maintain a link state database based on received OSPF messages from adjacent routers in IP network 304. The link state database may include information regarding network topology and link metrics. From this network topology and link metric information, each per interface router R1–R3 generates a per interface routing table containing routes to remote voice over IP hosts with cost associated with each route. For example, as illustrated in FIG. 3, voice over IP path 1–5 from voice over IP host HI to voice over IP host H5 may be assigned a total cost of five because the internal cost in media gateways 300 and 302 are each one and the network cost is three.

The present invention is not limited to using a link state routing exchange protocol, such as OSPF to may maintain network-awareness. In an alternate embodiment, media gateway 300 may implement a distance vector routing protocol, such as routing information protocol (RIP), without departing from the scope of the invention. Any suitable routing protocol that provides knowledge of current network conditions and topology may be used. By participating in network routing protocols, media gateway 300 maintains a real time view of paths to media gateway 302 and IP network 304 dynamically adjusts routes to voice over IP hosts H1–H4.

In order to avoid unnecessary processing, media gateway 300 may implement a modified version of routing protocol. Using OSPF as an example, conventional OSPF routers receive link state announcements (LSAs) on a given input port forward the link state announcements over all output ports. According to the version of OSPF that may be implemented by media gateway 300, only link state information associated with internal routes is advertised to other nodes. LSAs regarding external destinations are preferably not flooded to output ports of media gateway 300. In addition, media gateway 300 preferably only processes LSAs that relate to routes to remote voice over IP hosts and ignores LSAs relating to other routes, such as data routes. Finally, per interface routers R1–R3 preferably implement separate OSPF stacks and do not share routing information with each other. As a result of these modifications of the standard routing protocol, the processing load on media gateway 300 caused by implementation of the routing protocol is reduced.

In the version of OSPF implemented by media gateway 300, the IP addresses of IP hosts H1–H4 may be stored in an OSPF host table maintained for each interface. The host table for each interface may include IP addresses and costs for voice over IP hosts reachable through each interface. Per-interface routers R1–R3 can send advertisemerits of the IP addresses reachable through the interface along with the assigned cost. Outgoing OSPF messages may also include a router ID for each interface such that routers in network 304 will view each interface on media gateway 300 as an OSPF router and has reachability to a set of IP addresses.

Incoming traffic distribution through interfaces I1–I3 can be controlled by varying the assigned costs to links within media gateway 300. Decreasing the cost associated with one of the internal links increases the chance for distribution of traffic to the interface associated with the link. Conversely, increasing the cost of a link may cause distributing traffic to the interfaces that are not associated with the link.

Costs can be assigned to internal links such that each IP host has a primary interface and a number of secondary interfaces. The primary interface is assigned a lower cost than the secondary interfaces. For example, referring to FIG. 3, the primary interface of IP host Hi is interface I1 with cost 1. The secondary interface of IP host H1 is interface I3 with cost 1000. Therefore, typically, incoming and outgoing traffic for each host is routed to the primary interface. Traffic can be re-routed to the secondary interface when network failure occurs.

As stated above, the cost assigned to internal associations between interfaces I1–I3 and voice over IP host H1–H4 may be assigned by the media gateway operator and stored in internal cost matrix 310. Table 1 shown below illustrates an exemplary internal cost matrix for media gateway 300 shown in FIG. 3.

TABLE 1

Internal Link Cost Matrix for Media Gateway 300 of FIG. 3

|  | Interface I1 | Interface I2 | Interface I3 |
|---|---|---|---|
| Host H1 | 1 | ∞ | 1000 |
| Host H2 | ∞ | 1 | 1000 |
| Host H3 | 1000 | ∞ | 1 |
| Host H4 | ∞ | 1000 | 2 |

In Table 1, each cell represents the cost of an internal link. For example, the internal cost between interface I1 and host H1 is shown to be 1. The internal cost from interface I2 to host H1 is shown as infinity, because host H1 is not reachable via interface I2 in the exemplary configuration illustrated in FIG. 3. The internal cost of the link between interface I3 and host H1 is shown to be 1000, since this link is intended to be a backup link that will only be used if interface I1 fails. Thus, by appropriately provisioning values in cost matrix 310, the media gateway operator can engineer traffic over a specified link.

VoIP Path Selection

Figure 5:
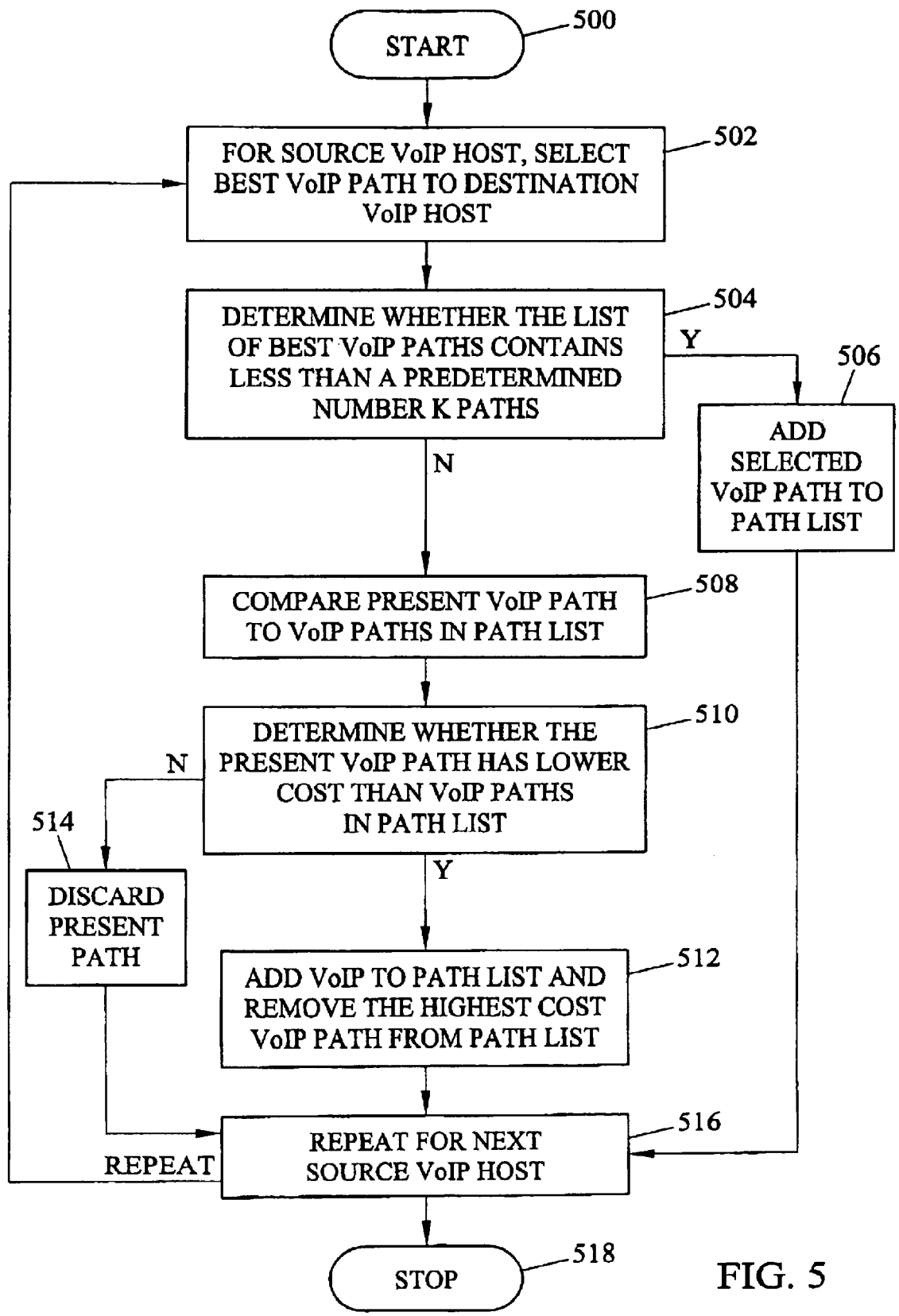
FIG. 5 is a flow chart illustrating an exemplary destination-fixed voice over IP path selection algorithm according to an embodiment of the present invention.
Figure 6:
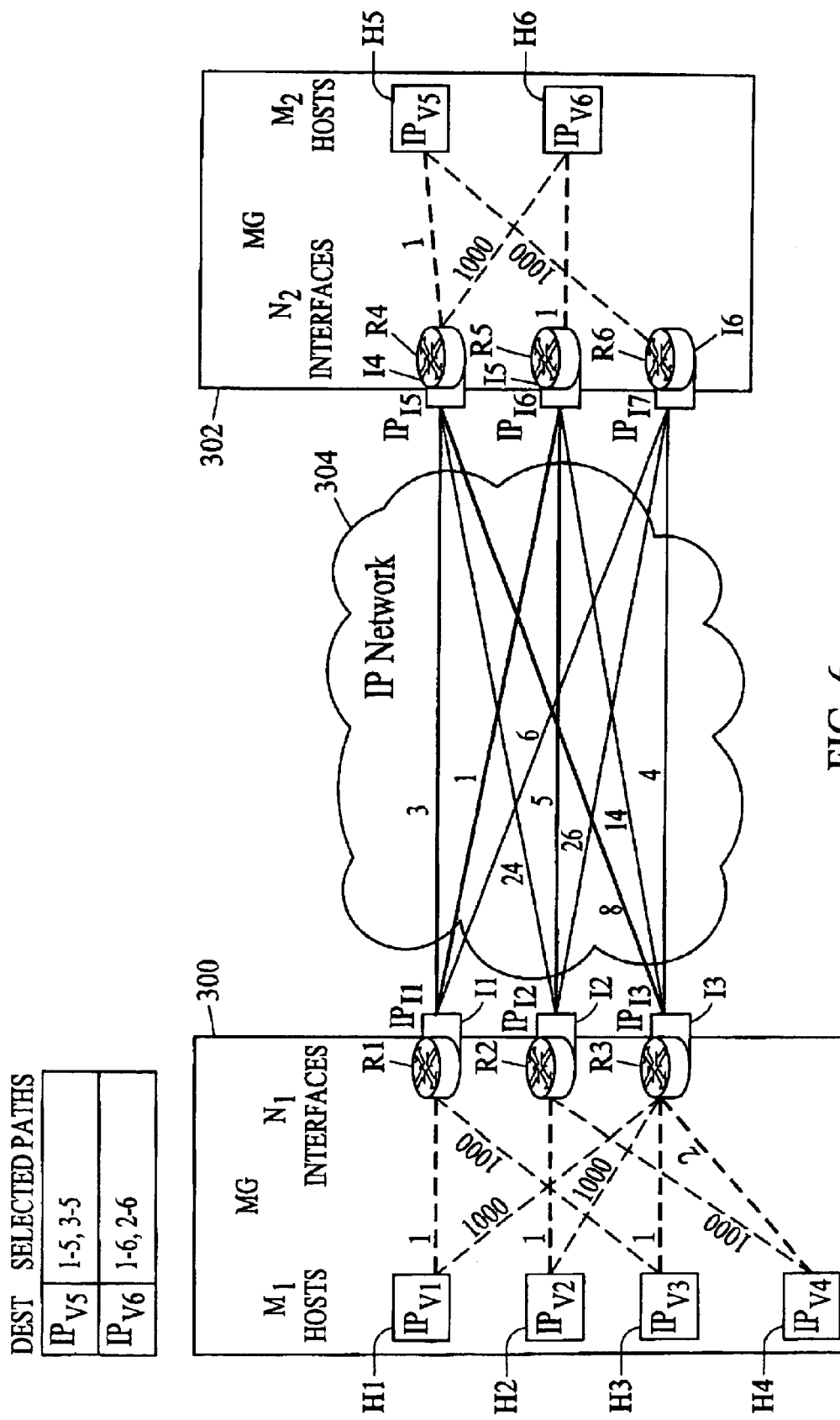
FIG. 6 is a network diagram illustrating exemplary voice over IP paths selected using the destination fixed voice over IP path selection algorithm according to an embodiment of the present invention.

The process of selecting a set of best voice over IP paths between voice over IP destinations is referred to herein as voice over IP path selection. Exemplary voice over IP path selection methods that may be used herein include a destination-fixed method, a matrix walk method, and a paired selection method. The destination-fixed path selection algorithm may be used when the destination voice over IP host is fixed, and it is desirable to find the lowest cost path from a plurality of source voice over IP addresses to the fixed destination voice over IP address. FIG. 5 is a flow chart illustrating exemplary steps that may be performed by media gateway 300 in a destination-fixed selection process for VoIP path selection. FIG. 6 is a network diagram illustrating exemplary paths that may be selected using the destination-fixed path selection algorithm of FIG. 5.

Referring to FIG. 5, the destination-fixed path selection algorithm starts in step 500. In step 502, for each source voice over IP host, media gateway 300 selects the best voice over IP path via different local interfaces to a destination voice over IP host. In the example illustrated in FIG. 6, the first source voice over IP host is IP host H1. For destination voice over IP host H5, the lowest-cost path from voice over IP host H1 is via interface I1 and interface I5. This path is illustrated in FIG. 6 as path 1–5, with a total cost of 5. Returning to FIG. 5, in step 504, media gateway 300 determines whether the list of best voice over IP paths contains less than a predetermined number K paths. The number K is preferably set to at least two paths to provide path redundancy and is preferably set to no more than the number of interfaces on the source media gateway.

If the list of best voice over IP paths contains less than K paths, control proceeds to step 506 where the selected path is added to the list of best voice over IP paths. Since the list is initially empty, the first path will be added to the list. If the list of best voice over IP paths is not less than the predetermined number K, control proceeds to step 508 where the present voice over IP path is compared to the voice over IP paths currently in the list. In step 510, if the present path has a lower cost than the voice over IP paths in the list, control proceeds to step 512 where the voice over IP path is added to the list and the highest cost path is removed from the list. If, in step 510, the present path does not have a lower cost than the remaining paths in the list, control proceeds to step 514 where the present path is discarded.

After the present path is discarded, control proceeds to step 516 where the process is repeated for the next source voice over IP address. Similarly, in step 506, if the present path has been added to the list, control proceeds to step 516 where the process is repeated for the next source voice over IP host. Steps 502–516 may be repeated until all source voice over IP hosts have been tested. The result of executing the destination-fixed algorithm illustrated in FIG. 5 is an ordered list of K lowest cost voice over IP paths from a given source media gateway to a destination voice over IP host. If the destination media gateway includes multiple voice over IP hosts, the process may be repeated to determine the lowest cost paths to each destination voice over IP host.

FIG. 6 illustrates the result of executing the destination-fixed algorithm in FIG. 5 for voice over IP hosts $IP_{v5}$ and $IP_{v6}$ in media gateway 300. In FIG. 6, the paths are identified by source and destination voice over IP hosts. For example, path 1–5 in FIG. 6 refers to the path from IP host H1 to IP host H5 via their primary interfaces. Similarly, path 3–5 refers to the lowest cost voice over IP path from IP host H3 to IP host H5. The lowest cost paths are indicated by the bold lines in IP network 304. It can be seen from the example in FIG. 6 that the result of executing the destination fixed algorithm twice, once for each voice over IP host, yields the K lowest cost paths to each destination voice over IP host.

As indicated above, the destination-fixed path selection algorithm may be used when the destination voice over IP host is fixed and it is desirable to select a set of voice over IP paths to that destination. In other instance, a media gateway may be free to select both source and destination voice over IP hosts between two media gateways. If both source and destination voice over IP hosts are to be selected in generating a path list, media gateway 300 may utilize a matrix-walk path selection process for VoIP path selection. This process can be utilized for selecting a VoIP path when both a destination and a source VoIP host needs to be selected. Additionally, the process can be utilized to update a VoIP path list for a particular destination media gateway (such as media gateway 302). The VoIP path list can include VoIP paths connecting a set of $M_1$ IP hosts of media gateway 300 with a set of $M_2$ IP hosts of media gateway 302. Media gateways 300 and 302 are assumed to have $N_1$ and $N_2$ interfaces, respectively.

Figure 7:
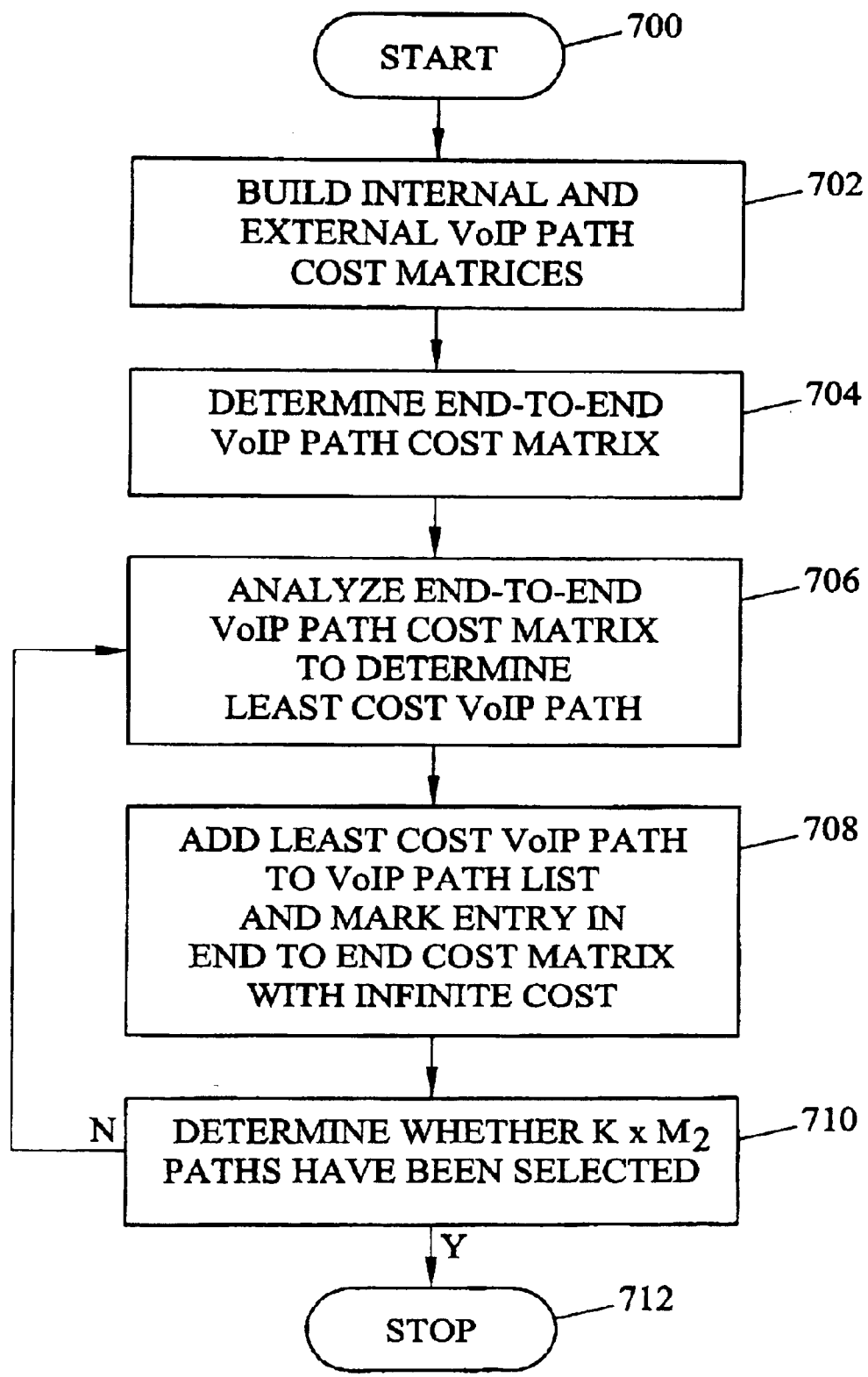
FIG. 7 is a flow chart illustrating an exemplary matrix walk voice over IP path selection algorithm according to an embodiment of the present invention.
Figure 8:
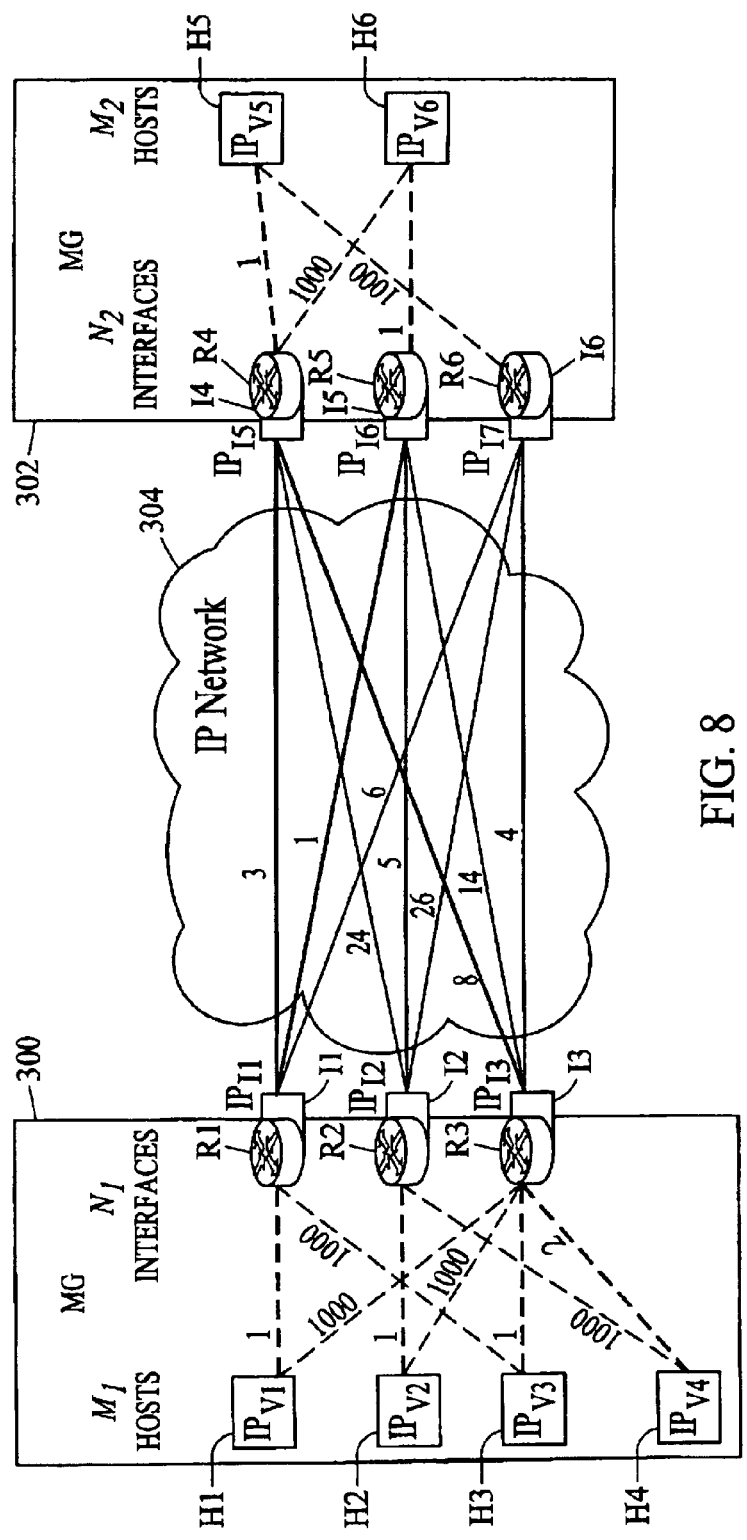
FIG. 8 is a network diagram illustrating exemplary voice over IP paths selected using the matrix walk voice over IP selection algorithm according to an embodiment of the present invention.

FIG. 7 is a flow chart illustrating exemplary steps that may be performed by media gateway 300 in a matrix-walk path selection process for VoIP path selection. FIG. 8 is a network and matrix diagram illustrating exemplary VoIP cost matrices for the VoIP path selection algorithm of FIG. 7. Referring to FIG. 7, the process can start at step 700. Next, in step 702, cost matrices can be built corresponding to the costs between the set of $M_1$ IP hosts and the set of $N_1$ interfaces ($C_{M1}=M_1 \times N_1$); the costs between the set $N_1$ and $N_2$ of interfaces ($C_{net}=N_1 \times N_2$); and the costs between the set of $N_2$ interfaces and the set of $M_2$ IP hosts ($C_{M2}=M_2 \times N_2$).

An end-to-end VoIP path cost matrix can be determined (step 704). The end-to-end VoIP path cost matrix can equal $C_1 \cdot C_{net} \cdot C_2$. The symbol "." represents a minimum-cost concatenation operator applied to matrix operations $C(M \times L)=A(M \times N) \cdot B(N \times L)$, where n=1...N, m=1...M, and l=1...L. Each element in the matrix C is identified by $C_{ml}$, where=min$\{a_{mn}+b_{nl}\}$ among all n, for a given m and l. Exemplary matrices $CM_1$, $CM_2$, $CM_{net}$ and CM are illustrated in FIG. 6.

Returning to FIG. 7, in step 706, media gateway 300 analyzes each element of the end-to-end VoIP path cost matrix CM to determine the least cost VoIP path. The least cost VoIP path is added to the ordered list of best VoIP paths and the corresponding entry in matrix CM is marked with an infinity cost to prevent this path from being re-selected (step 708). If $K \times M_2$ paths have not been selected, control returns to step 706 and steps 706 and 708 are repeated to add the next lowest-cost VoIP path to the path list. In step 710, if $K \times M_2$ paths have been selected, control proceeds to step 712 where the process ends. The result of the process a list of $K \times M_2$ VoIP lowest cost paths from media gateway MG1 to MG2.

In yet another alternate embodiment, media gateway 300 may utilize a paired selection process for VoIP path selection. The VoIP path list can include VoIP paths connecting a set of $M_1$ IP hosts of media gateway 300 with a set of $M_2$ IP hosts of media gateway 302. The set of $M_1$ IP hosts form a set $V_1$. The set of $M_2$ IP hosts forms a set $V_2$. Media gateways 300 and 302 are assumed to have $N_1$ and $N_2$ interfaces, respectively.

Figure 9:
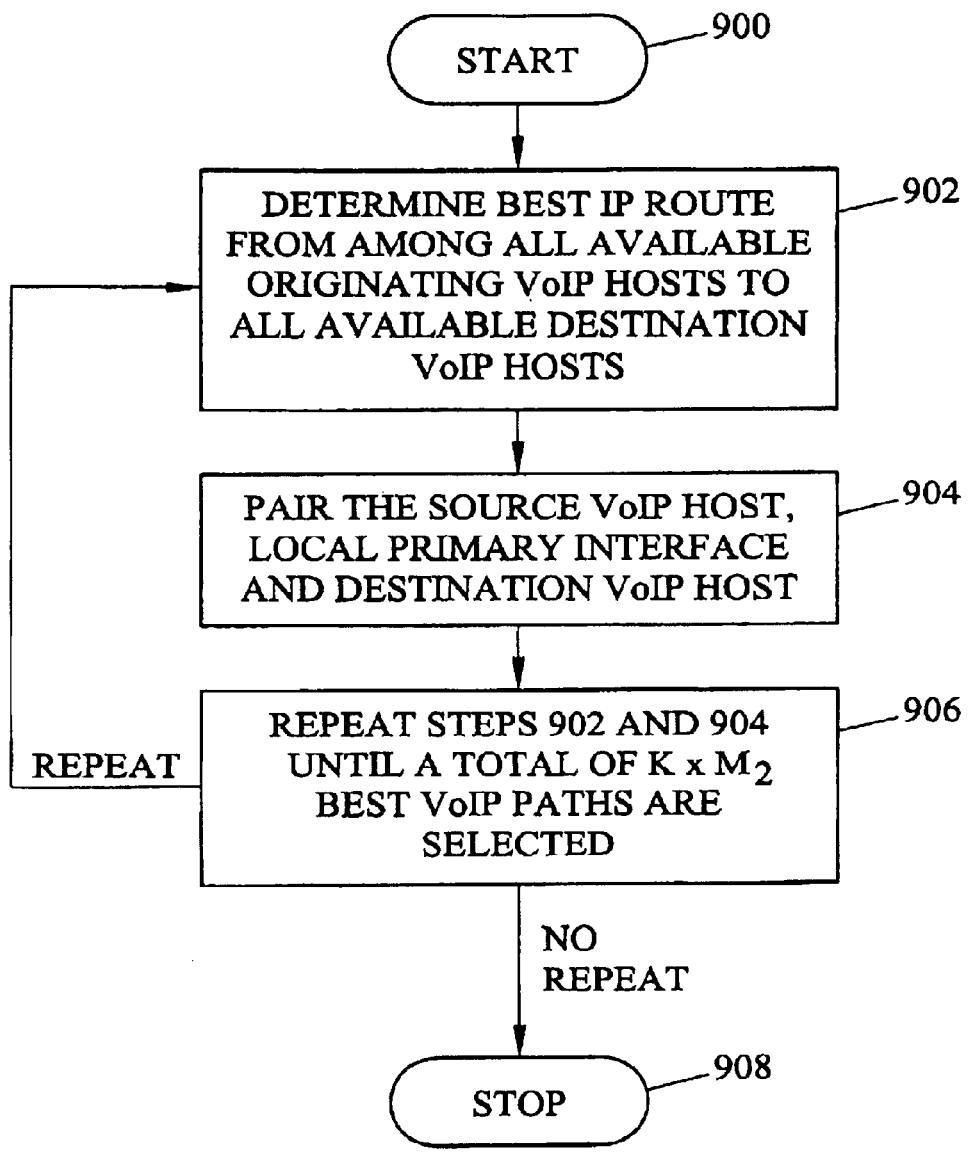
FIG. 9 is a flow chart illustrating an exemplary paired voice over IP path selection algorithm according to an embodiment of the present invention.
Figure 10:
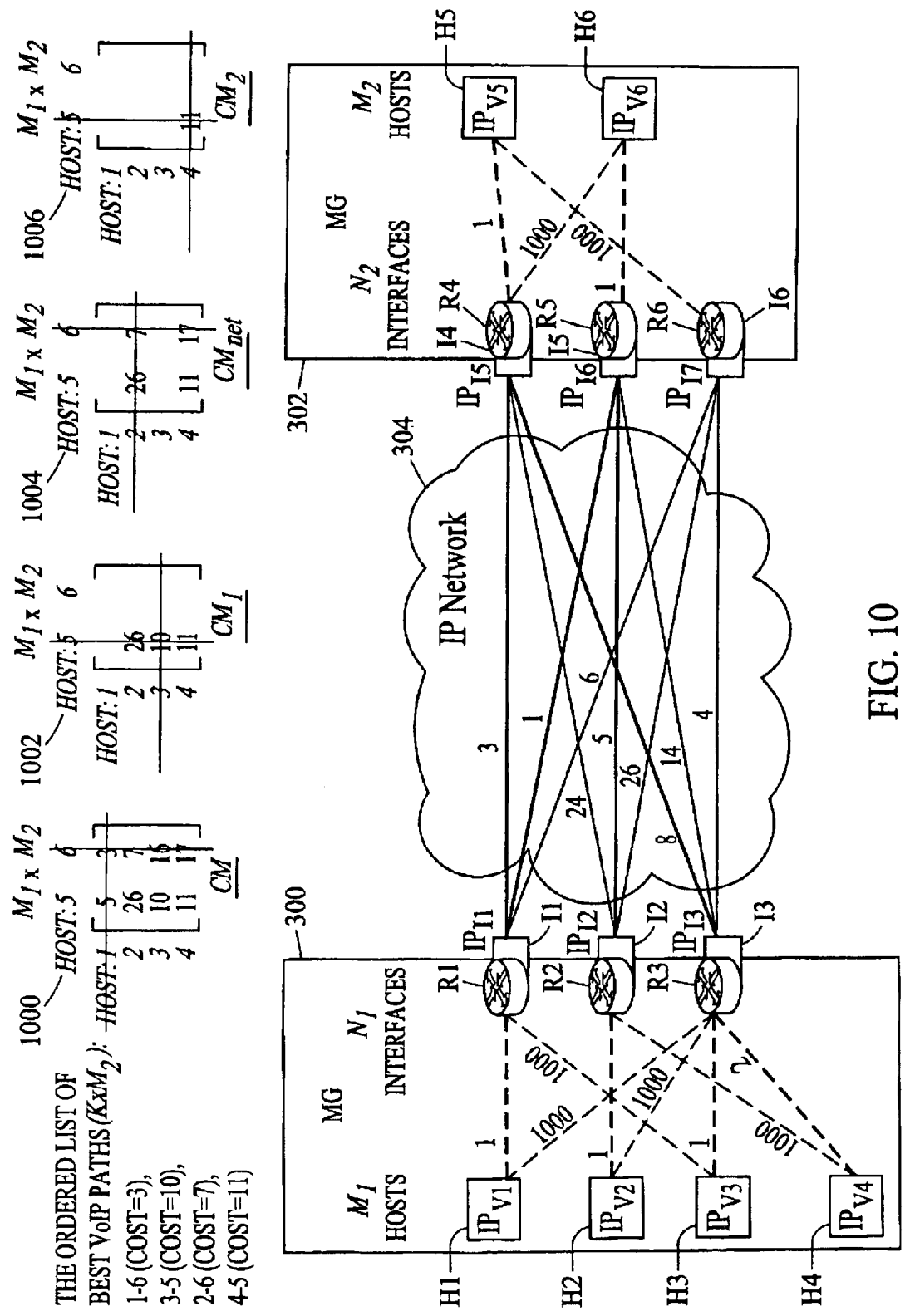
FIG. 10 is a network diagram illustrating exemplary voice over IP paths selected using the paired voice over IP path selection algorithm according to an embodiment of the present invention.

FIG. 9 is a flow chart illustrating exemplary steps that may be performed by media gateway 300 in a paired-selection process for VoIP path selection. FIG. 10 is a network diagram illustrating exemplary cost matrices that may be used in the paired selection algorithm of FIG. 9. Referring to FIG. 9, the process can start at step 900. Next, in step 902, media gateway 300 can determine the best IP route from among all available source IP hosts in set $V_1$ (via all available primary interfaces in set $I_1$) to all available destination IP hosts in set $V_2$ at a destination media gateway (such as media gateway 302 shown in FIG. 4). Next, in step 904, the corresponding source IP host, the corresponding local primary interface, and destination IP host are paired and removed from sets, $V_1$, $I_1$, and $V_2$, respectively, of the best route selected in 904.

Steps 902 and, 904 can be repeated until a total of $K \times M_2$ best VoIP paths are selected (step 906). Next, the process can stop at step 908. The result of the process is that the selected $K \times M_2$ best IP routes are the VoIP paths from media gateway 300 to all destination IP hosts at media gateway 302.

FIG. 10 illustrates the results of applying steps 902 and 904 to the media gateway configuration illustrated in FIG. 3. Referring to FIG. 10, the lowest cost path between any two voice over IP hosts of media gateways 300 and 302 is the path between host 1 and host 6, with a cost of 3. Accordingly, the path 1–6 is added to the ordered list of best voice over IP paths, and the corresponding source and destination voice over IP hosts are removed from the $M_1 \times M_2$ cost matrix 1000. The removal of all entries having host 1 or host 6 is indicated by the intersecting horizontal and vertical lines in matrix 1000. Cost matrix 1002 illustrates the results of removing host 1–6 from the cost matrix. Since 3–5 is the lowest cost path remaining in the cost matrix, all entries having host 3 or host 5 are removed from the cost matrix, and 3–5 is added to the order list of voice over IP paths. In matrix 1004, since all of the hosts in media gateway 302 were removed in the first two steps, entries for hosts from media gateway 302 that were removed in previous steps but not selected for the path list are added back to the cost matrix. Matrix 1004 illustrates the result of adding the remaining entries from media gateway 302 to the cost matrix and selecting the entry corresponding to path 2–6 as the next lowest cost path. When this occurs, path 2–6 is added to the cost matrix and the corresponding source and destination voice over IP hosts are removed from the cost matrix. Matrix 1006 illustrates the entries remaining in the cost matrix after removing IP hosts 2 and 6. The remaining lowest cost path is 4–5, indicating that path 4–5 is the next lowest cost path. This path is then added to the path list. In this example K is assumed to be 2 and media gateway 302 has $M_2=2$ hosts. Thus, after path 4–5 has been selected in matrix 1006, $K \times M_2=4$ paths have been selected, and the paired path selection algorithm ends. Thus, the result of performing the paired selection algorithm is an ordered list of $K \times M_2$ voice over IP paths.

Session Assignment

Once path selection has been performed, for every new VoIP session or call between media gateways, a VoIP path must be selected from the path list and assigned to the session. The session assignment can be determined at a softswitch, at a media gateway, or at a centralized VoIP Traffic Engineering server. Regardless of which entity performs session assignment, session assignment may include selecting an available path from a list of available paths between source and destination IP addresses. Exemplary session assignment routines performed by a softswitch, a media gateway, and a traffic engineering server will now be described.

Figure 11:
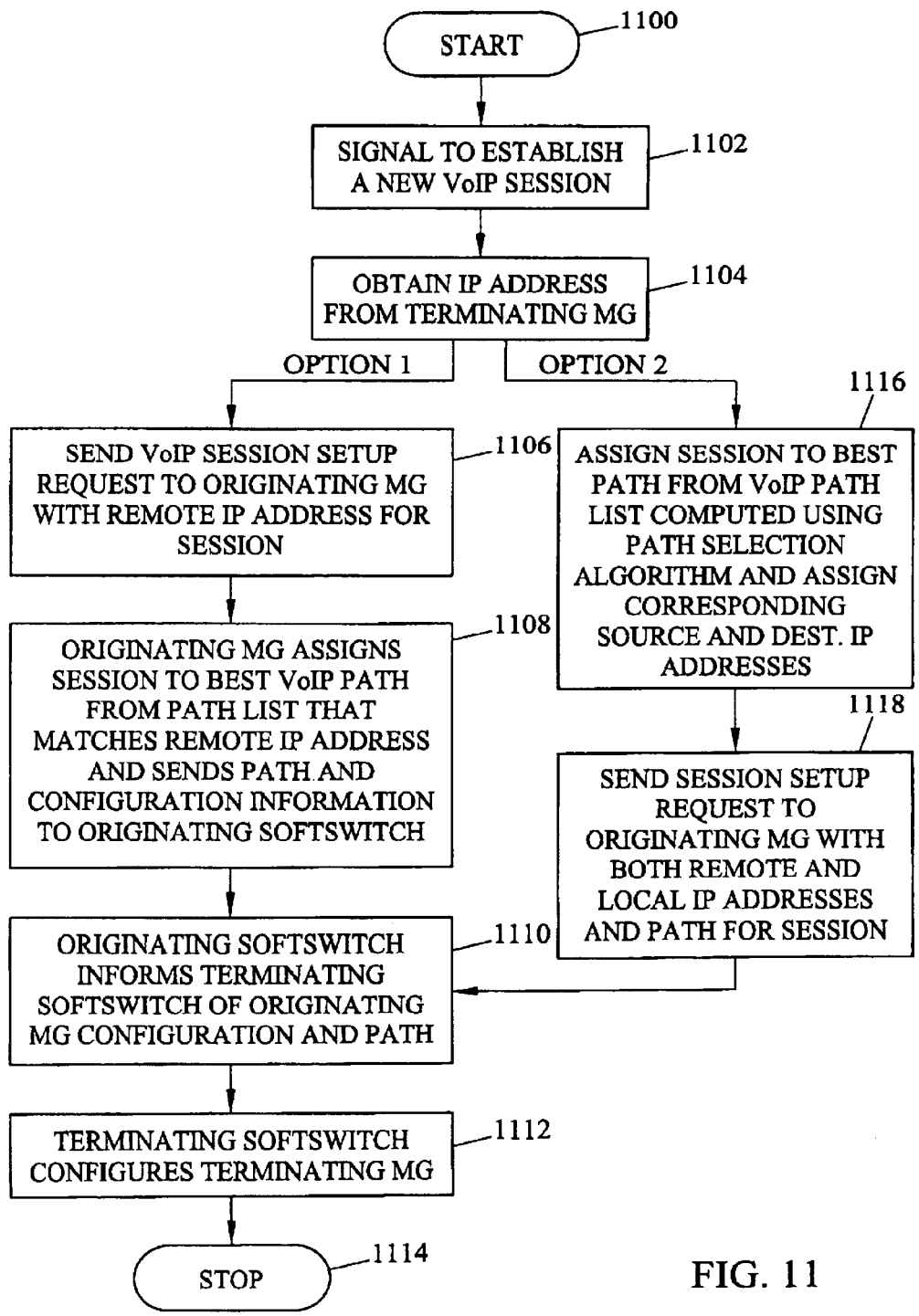
FIG. 11 is a flow chart illustrating an exemplary session assignment algorithm that may be performed by a softswitch in assigning a voice over IP session to a voice over IP path according to an embodiment of the present invention.

FIG. 11 is a flow chart illustrating exemplary steps that may be performed by a softswitch (such as softswitch 318 shown in FIG. 3) in VoIP session assignment according to an embodiment of the present invention. Referring to FIG. 11, the process can start when a session request is received from a media gateway (step 1100). Instep 1102, softswitch 318 may perform signaling for establishing a new VoIP session. In step 1104, the originating softswitch obtains a VoIP session IP address from the terminating media gateway. In step 1104, the next step is optional depending on the session assignment algorithm that is implemented by softswitch 318. Two exemplary session assignment routines are indicated as option 1 and option 2 in FIG. 11. If originating softswitch 318 implements option 1, control proceeds to step 1106 where originating softswitch 318 sends a voice over IP session setup request to an originating media gateway with the remote IP address assigned to the session. In step 1108, the originating media gateway assigns the session to the best voice over IP path from the list of IP paths that matches the remote IP address and sends path and configuration information to the originating softswitch. In step 1110, the originating softswitch informs the terminating softswitch of the originating media gateway configuration and path. In step 1112, the terminating softswitch configures the terminating media gateway based on the received path and configuration information. The process ends in step 1114.

Returning to step 1104, if the softswitch implements session assignment option 2, control proceeds to step 1111 where the softswitch assigns the session to the best voice over IP path computed using the path selection algorithm. In other words, the softswitch performs the path selection algorithm and selects the best available voice over IP path for the session. In step 1118, the originating softswitch sends a session setup message to the originating media gateway with both remote and local IP addresses and the path for the session. Control then returns to step 1110 and 1112 where the originating softswitch informs the terminating softswitch of the originating media gateway configuration and path, and the terminating softswitch configures the terminating media gateway.

Figure 12:
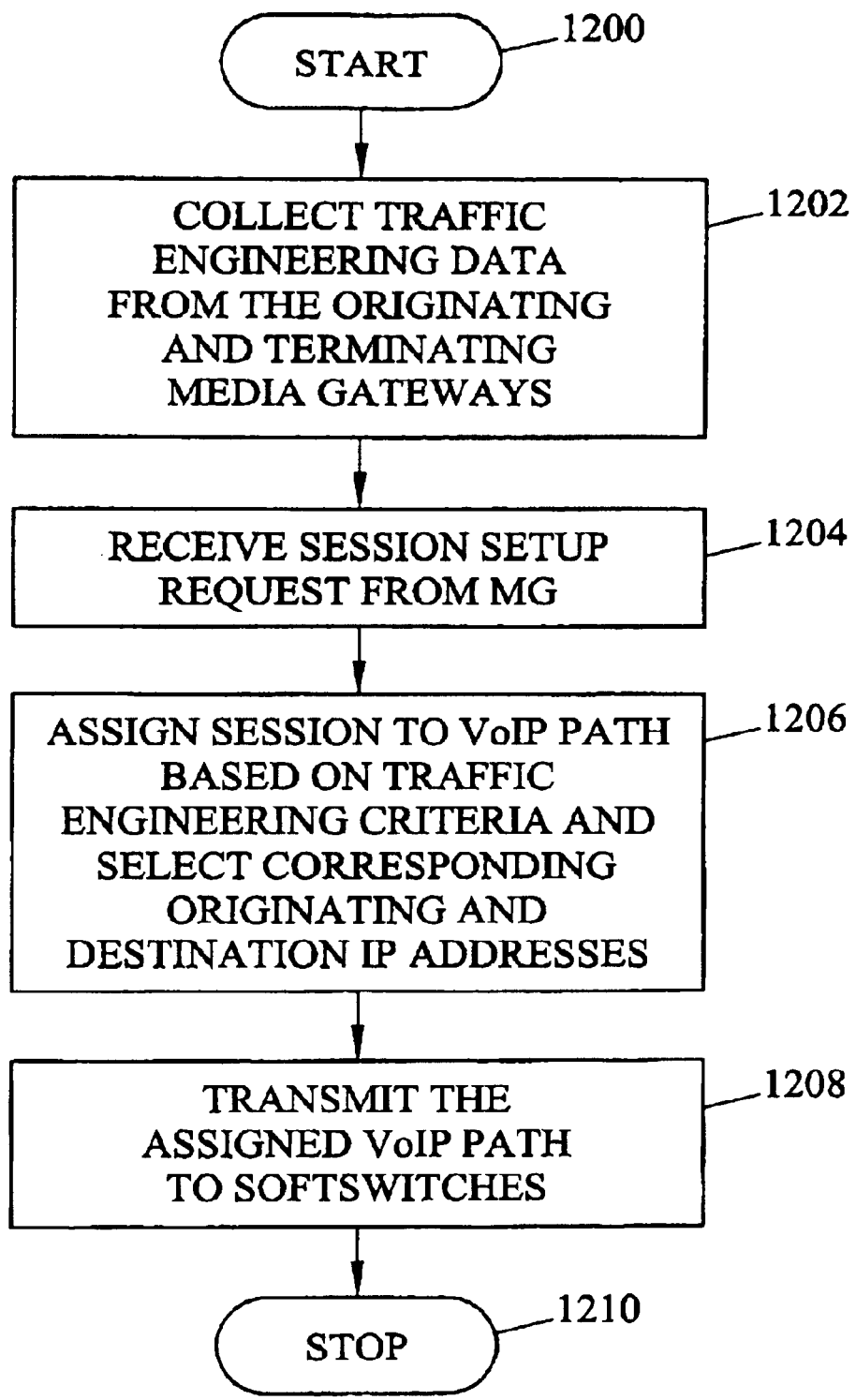
FIG. 12 is a flow chart illustrating an exemplary voice over IP session assignment algorithm that may be executed by a voice over IP traffic engineering server in assigning a voice over IP session to a voice over IP path according to an embodiment of the present invention.

In an alternate implementation, rather than have a softswitch control session assignment, session assignment may be performed by a VoIP TE server, such as the server 324 illustrated in FIG. 3. Server 324 may select a VoIP path when it has cost information regarding internal links of media gateways 300 and 302 and the paths of network 304. FIG. 12 is a flow chart illustrating exemplary steps that may be performed by a centralized VoIP TE server in performing VoIP session assignment according to an embodiment of the present invention. Referring to FIG. 12, in step 1200, the server-based session assignment algorithm begins. In step 1202, the traffic engineering server collects traffic engineering data from originating and terminating media gateways. Traffic engineering data step 1202 may be performed continuously based on network routing information computed the media gateways and internal cost matrices of the media gateways. In step 1204, traffic engineering server 324 receives a session setup request from a media gateway. In step 1206, traffic engineering server 324 assigns the session to a VoIP path from a list of available voice over IP paths computed using one of the voice over IP path selection algorithms described above and selects source and destination IP addresses corresponding to the voice over IP path. The path may be assigned based on traffic engineering criteria, such as any of the cost-related criteria described above. In step 1208, server 324 transmits the assigned voice over IP path to the source and destination softswitches. In step 1210, the process ends.

Figure 13:
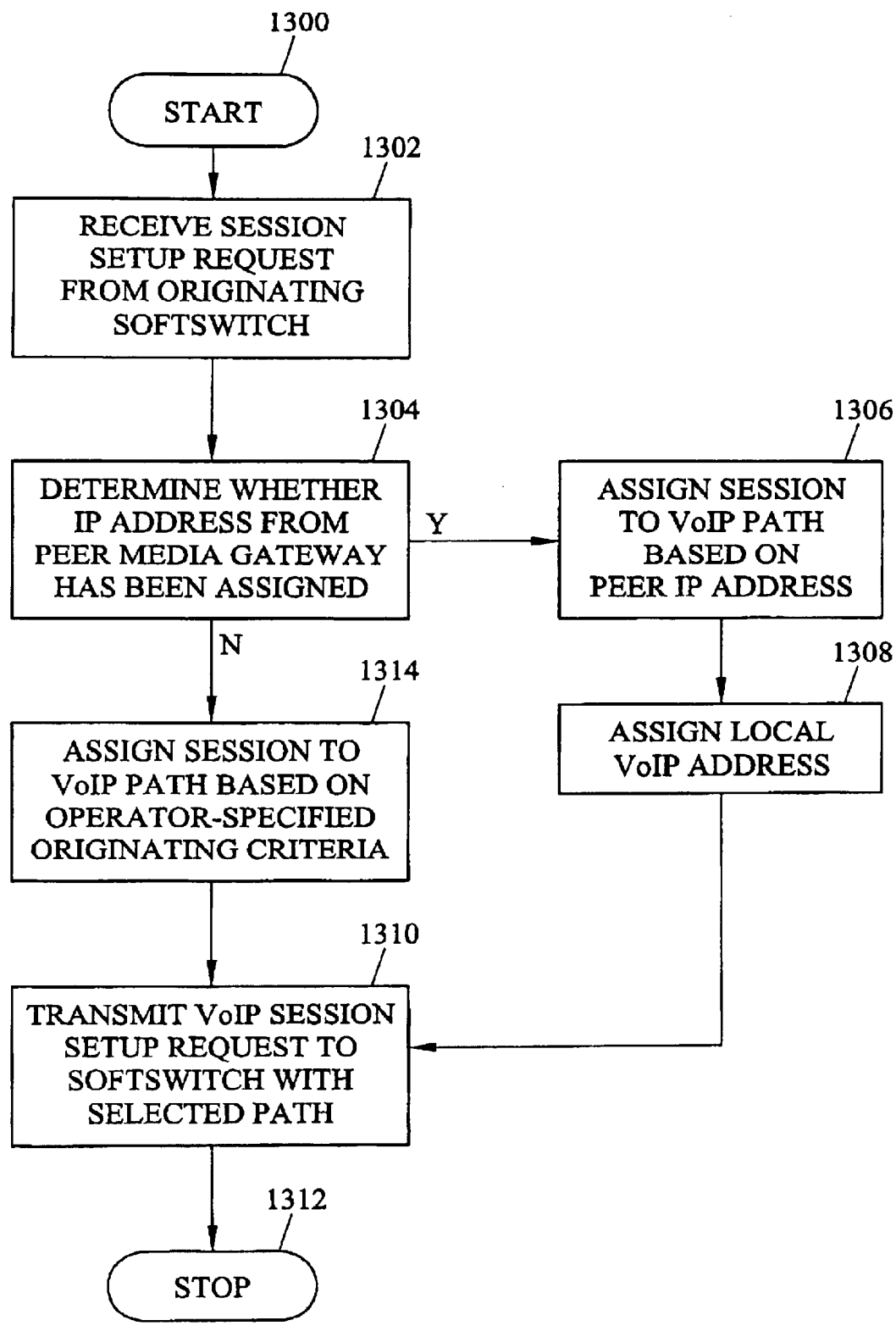
FIG. 13 is a flow chart illustrating exemplary steps that may be performed by a media gateway in assigning a voice over IP session to a voice over IP path according to an embodiment of the present invention.

In yet another alternate implementation, voice over IP session assignment may be performed at a media gateway, such as media gateway 300 illustrated in FIG. 3. FIG. 13 is a flow chart that may be performed media gateway in VoIP IP session assignment according to an embodiment of the present invention. Referring to FIG. 13, the media-gateway-based session assignment process begins in step 1300. In step 1302, the media gateway receives a session setup request from a softswitch. In step 1304, the media gateway determines whether an IP address from the peer media gateway associated with the session has been assigned. If a remote IP address has been assigned, control proceeds to step 1306 where a session is assigned to the voice over IP path based on the peer IP address. This step may be performed by performing a lookup in the ordered list of paths computed using the path selection algorithm to determine the lowest cost path. In step 1308, the media gateway assigns a local voice over IP address corresponding to the selected path. In step 1310, the media gateway transmits a voice over IP session setup request to the originating softswitch including the selected path. The originating softswitch communicates this information to the terminating softswitch, which directs the terminating media gateway to setup a session along the selected path. The process ends at step 1312.

Returning to step 1304, if it is determined that a remote IP address has not been assigned, control proceeds to step 1314 where the media gateway assigns the session to a voice over IP path based on operator specified criteria. Operator specified criteria that may be used in session assignment may include a traffic distribution scheme such as ordered weight distribution, equal distribution, bandwidth utilization distribution, and measurement based distribution. Once the session has been assigned to a voice over IP path, control proceeds to step 1310 where the media gateway transmits a voice over IP session setup request to the originating media gateway with the selected path.

Traffic Engineering and Real Time Traffic Monitoring

As stated above, sessions may be assigned to the ordered list of voice over IP paths based on traffic engineering considerations, such as load balancing, cost, delay, etc. In one exemplary implementation, sessions may be assigned to voice over IP paths based on real time monitoring of traffic on the voice over IP paths. In order to determine the state of a path in real time, a media gateway, such as media gateway 300 may use measurement mechanisms, such as a dedicated RTP/RTCP session in each path for delay monitoring. In an alternate implementation, a media gateway may use IP based delay measurement mechanisms, such as packet Internet groper (PING). In suitable mechanism for measuring the layer of congestion over a voice over IP path is intended to be within the scope of the invention.

Once the status of a voice over IP path has been determined, this status can be used in assigning voice over IP sessions using any of the session assignment algorithms described above. For example, the cost associated with each path may be updated based on dynamic condition changes in each path. The dynamically updated path costs can then be used to dynamically change the path list using one of the path selection algorithms described above. The dynamically updated path list may be used to assign paths to existing voice over IP sessions, new voice over IP sessions, or both.

In addition to changing the voice over IP path list based on dynamically changing traffic conditions, the path list may be updated based on provisioned conditions, such as policy changes, bandwidth price changes, etc. The media gateway operator may update the path cost matrix to reflect changes in these conditions. The updated cost matrix may be used to calculate a new voice over IP path list. The new voice over IP path list may be used to assign paths to existing voice over IP sessions, new voice over IP sessions, or both.

Thus, as described above, the present invention includes methods and systems for providing voice over IP traffic engineering and path resilience using a network-aware media gateway. A network-aware media gateway advertises reachability to multiple voice over IP hosts via multiple interfaces. As a result, the network develops multiple paths to each voice over IP host. In addition, the media gateway receives routing protocol information regarding remote voice over IP destinations and dynamically updates route cost information associated with each destination. Such dynamic updating of cost information enables the media gateway to respond in real time to changing network conditions.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for providing a network-aware media gateway having voice over IP (VoIP) hosts, the method comprising:

in a media gateway:
(a) providing a plurality of voice over IP hosts containing media processing modules for processing media streams associated with media sessions between media gateways;
(b) assigning a first set of IP addresses to the voice over IP hosts;
(c) providing a plurality of network interfaces for connecting the voice over IP hosts to a network;
(d) assigning a second set of IP addresses to the network interfaces, wherein addresses in the second set of IP addresses differ from addresses in the first set of IP addresses; and (e) providing a plurality of per interface routers corresponding to the plurality of network interfaces, wherein the per interface routers advertise reachability information regarding at least one of the voice over IP hosts to the network via at least two of the interfaces and wherein the per interface routers receive network routing information from the network and generate per interface routing tables based on the network routing information.

2. The method of claim 1 comprising assigning costs to internal associations between the per-interface routers and voice over IP hosts reachable via the per interface routers.

3. The method of claim 2 wherein assigning costs to internal associations between the per-interface routers and voice over IP hosts reachable via the per interface routers includes assigning costs that are substantially equal to network route costs to remote voice over IP hosts.

4. The method of claim 2 wherein assigning costs to internal associations between the per-interface routers and voice over IP hosts reachable via the per interface routers includes assigning costs that are at least one order of magnitude greater than network route costs to remote voice over IP hosts.

5. The method of claim 2 wherein assigning costs to internal associations between the per-interface routers and voice over IP hosts reachable via the per interface routers includes assigning costs to the links that are at least one order of magnitude less than network route costs to remote voice over IP hosts.

6. The method of claim 1 comprising executing a path selection algorithm to determine a list of voice over IP paths to a remote voice over IP host based on the per interface routing tables.

7. The method of claim 6 wherein executing a path selection algorithm includes executing a destination-fixed path selection algorithm where lowest cost paths from each of the voice over IP hosts in the media gateway are selected to a fixed destination voice over IP host.

8. The method of claim 6 wherein executing a path selection algorithm includes executing a matrix-walk path selection algorithm including:
  (a) computing an end-to-end cost matrix indicating routing costs between the voice over IP hosts in the media gateway and voice over IP hosts in a destination media gateway; and
  (b) selecting a predetermined number of lowest cost paths from the end-to-end cost matrix.

9. The method of claim 6 wherein executing a path selection algorithm includes executing a paired path selection algorithm including:
  (a) computing an end-to-end cost matrix indicating total costs of routes between the voice over IP hosts in the media gateway and a plurality of destination voice over IP hosts in a destination media gateway;
  (b) selecting a lowest cost path from the cost matrix and adding the lowest cost path to the path list;
  (c) removing voice over IP hosts associated with the lowest cost path from the matrix; and
  (d) repeating the lowest cost path selection and voice over IP host removal steps until a predetermined number of lowest cost paths are present in the path list.

10. The method of claim 6 comprising assigning voice over IP sessions to paths in the path list.

11. The method of claim 10 wherein assigning voice over IP sessions to the paths in the path list includes the assigning voice over IP sessions to the paths using traffic engineering criteria.

12. The method of claim 11 wherein assigning voice over IP sessions to the paths based on traffic engineering criteria includes assigning voice over IP sessions to the paths based on load balancing criteria.

13. The method of claim 11 wherein assigning voice over IP sessions to the paths based on traffic engineering criteria includes assigning voice over IP sessions to the paths based on financial cost criteria.

14. The method of claim 11 wherein assigning voice over IP sessions to the paths based on traffic engineering criteria includes assigning voice over IP sessions to the paths based on time related criteria.

15. The method of claim 10 comprising measuring path traffic and dynamically updating cost information associated with the path list and wherein assigning voice over IP sessions to the paths in the path list based on traffic engineering criteria includes assigning voice over IP sessions to the paths based on dynamically updated cost information.

16. The method of claim 10 wherein assigning sessions to the voice over IP paths includes assigning sessions to the voice over IP paths from the media gateway.

17. The method of claim 16 wherein assigning sessions to the voice over IP paths includes:
  (a) assigning a first session to a first path associated with a first interface in the media gateway and sending and receiving media stream packets associated with the first session through the first interface;
  (b) receiving packets associated with the first session over a second interface of the media gateway;
  (c) determining whether the media gateway is configured to allow dynamic path re-assignment for existing sessions;
  (d) in response to determining that the media gateway is configured to allow dynamic path reassignment for existing sessions, assigning the session to a new path associated with the second interface; and
  (e) in response to determining that the media gateway is not configured to allow dynamic path reassignment for existing sessions, dropping the first session.

18. The method of claim 10 wherein assigning sessions to the voice over IP paths includes assigning sessions from a softswitch associated with the media gateway.

19. The method of claim 10 wherein assigning sessions to the voice over IP paths includes assigning sessions from a voice over IP traffic engineering server associated with the media gateway.

20. The method of claim 10 comprising updating the path list and wherein assigning sessions to the voice over IP paths includes assigning new sessions to voice over IP paths in the updated path list.

21. The method of claim 10 comprising updating the path list and wherein assigning sessions to the voice over IP paths includes reassigning existing sessions to the paths in the updated path list.

22. The method of claim 1 wherein the per interface routers refrain from advertising routing information received by other per interface routers.

23. The method of claim 1 wherein the per interface routers refrain from routing data traffic that is not associated with a VoIP session.

24. A network-aware media gateway with multi-appearing voice over IP (VoIP) hosts, the media gateway comprising:
  (a) a plurality voice over IP hosts containing voice processing resources for processing media streams associated with media communication sessions between media gateways, the voice over IP hosts being assigned a first set of IP addresses;

(b) a plurality of network interfaces for connecting the voice over IP hosts to an external network, the network interfaces being assigned a second set of IP addresses, wherein IP addresses in the second set are different from IP addresses in the first set; and (c) a plurality of per interface routers associated with the network interfaces, wherein the per interface routers advertise reachability information regarding at least one of the voice over IP hosts to the network via at least two of the interfaces and wherein the per interface routers receive network routing information from the network and dynamically generate and maintain per interface routing tables.

25. The media gateway of claim 24 comprising a plurality of internal links for connecting the voice over IP hosts to the network interfaces and a cost matrix including costs associated with each of the internal links.

26. The media gateway of claim 25 wherein at least one of the costs in the cost matrix is substantially equal to a network route cost to a remote voice over IP host.

27. The media gateway of claim 25 wherein at least one of the costs in the cost matrix is at least one order of magnitude greater than a network route cost to a remote voice over IP host.

28. The media gateway of claim 25 wherein at least one of the cost in the cost matrix is at least one order of magnitude of less than a network route cost to a remote voice over IP host.

29. The media gateway of claim 24 comprising a resource manager for managing resources of the media gateway, wherein the resource manager is adapted to execute a VoIP path selection algorithm for generating a list of voice over IP paths to a remote voice over IP destination based on the per interface routing tables.

30. The media gateway of claim 29 wherein the resource manager is adapted to execute a destination-fixed path selection algorithm wherein the path list is generated by selecting a predetermined number of lowest-cost paths from the voice over IP hosts in the media gateway to a fixed destination voice over IP host.

31. The media gateway of claim 29 wherein the resource manager is adapted to execute a matrix walk path selection algorithm wherein the resource manager generates an end to end cost matrix including costs between voice over IP hosts in the media gateway and remote voice over IP hosts and selects best voice over IP paths for the path list based on the end to end cost matrix.

32. The media gateway of claim 29 wherein the resource manager is adapted to execute a paired path selection algorithm wherein the resource manager generates a cost matrix and selects the best voice over IP paths for the path list by selecting paths from the cost matrix and successively removing voice over IP hosts associated with each selected path from the cost matrix.

33. The media gateway of claim 29 for wherein the resource manager is adapted to assign media sessions to voice over IP paths in the path list.

34. The media gateway of claim 33 wherein the resource manager is adapted to assign voice over IP sessions to the voice over IP paths based on traffic engineering criteria.

35. The media gateway of claim 34 wherein the traffic engineering criteria includes path routing costs.

36. The media gateway of claim 34 wherein the traffic engineering criteria includes relative loading of the voice over IP paths.

37. The media gateway of claim 34 wherein the traffic engineering criteria include time based criteria.

38. The media gateway of claim 33 wherein the resource manager is adapted to dynamically measure traffic conditions on each of the voice over IP paths and assign the sessions to the voice over IP paths based on the dynamically measured traffic conditions.

39. The media gateway of claim 33 wherein the resource manager is adapted to detect whether packets associated with an existing session arrive on a new interface, and, in response, to dynamically assign the existing session to a new path.

40. A computer program product comprising computer executable instructions embodied in a computer readable medium for performing steps comprising:

(a) assigning a first set of voice over IP addresses to a plurality of voice over IP addresses to a plurality of voice over IP hosts in a media gateway;

(b) assigning a second set of voice over IP addresses to a plurality of network interfaces in the media gateway, wherein IP addresses in the second set differ from IP addresses in the first set;

(c) advertising reachability information regarding at least one of the voice over IP hosts to the network via at least two of the network interfaces; and (d) dynamically generating per-interface routing tables associated with each of the network interfaces based on routing information received from a network.

41. The computer program product of claim 40 comprising assigning costs to internal associations between the voice over IP hosts and the network interfaces.

42. The computer program of claim 41 wherein assigning costs includes assigning costs that are substantially equal to network routing costs to remote voice over IP hosts.

43. The computer program product of claim 41 wherein assigning costs includes assigning costs that are at least one order of magnitude greater than network routing costs to remote voice over IP hosts.

44. The computer program product of claim 41 wherein assigning costs includes assigning costs that are at least one order of magnitude of less than network routing costs to remote voice over IP hosts.

45. The computer program product of claim 40 comprising generating a voice over IP path list including voice over IP paths to a remote media gateway based on the per-interface routing tables.

46. The computer program product of claim 45 wherein generating a voice over IP path list includes generating a voice over IP path list using a destination-fixed path selection algorithm that includes selecting a predetermined number of best paths from the voice over IP host to a fixed voice over IP destination associated with the remote media gateway.

47. The computer program product of claim 45 wherein generating a voice over IP path list includes generating the voice over IP path list using a matrix walk algorithm that includes generating an end-to-end cost matrix between the voice over IP hosts and voice IP hosts associated with the remote media gateway and selecting a predetermined number of lowest cost paths from the end-to-end cost matrix.

48. The computer program product of claim 45 wherein generating a voice over IP path list includes generating a voice over IP path list using a paired selection algorithm that includes generating a cost matrix indicating costs of paths between the voice over IP hosts and voice over IP hosts associated with the remote media gateway, iteratively selecting lowest cost paths from the cost matrix, and removing voice over IP hosts associated with each selected path from the matrix.

49. The computer program product of claim 45 comprising assigning voice over IP sessions to the voice over IP paths in the path list.

50. The computer program product of claim 49 wherein assigning voice over IP sessions to the voice over IP paths includes assigning the voice over IP sessions to the voice over IP paths based on traffic engineering criteria.

51. The computer program product of claim 50 wherein the traffic engineering criteria include load-based traffic engineering criteria.

52. The computer program product of claim 50 wherein the traffic engineering criteria include cost-based traffic engineering criteria.

53. The computer program product of claim 50 wherein the traffic engineering criteria include time-based traffic engineering criteria.

54. The computer program product of claim 50 comprising dynamically measuring traffic conditions on the voice over IP paths and wherein assigning sessions to the voice over IP paths based on traffic engineering criteria includes assigning the sessions to the voice over IP paths based on the dynamically measured traffic conditions on the paths.

* * * * *